Figures 1, 2:
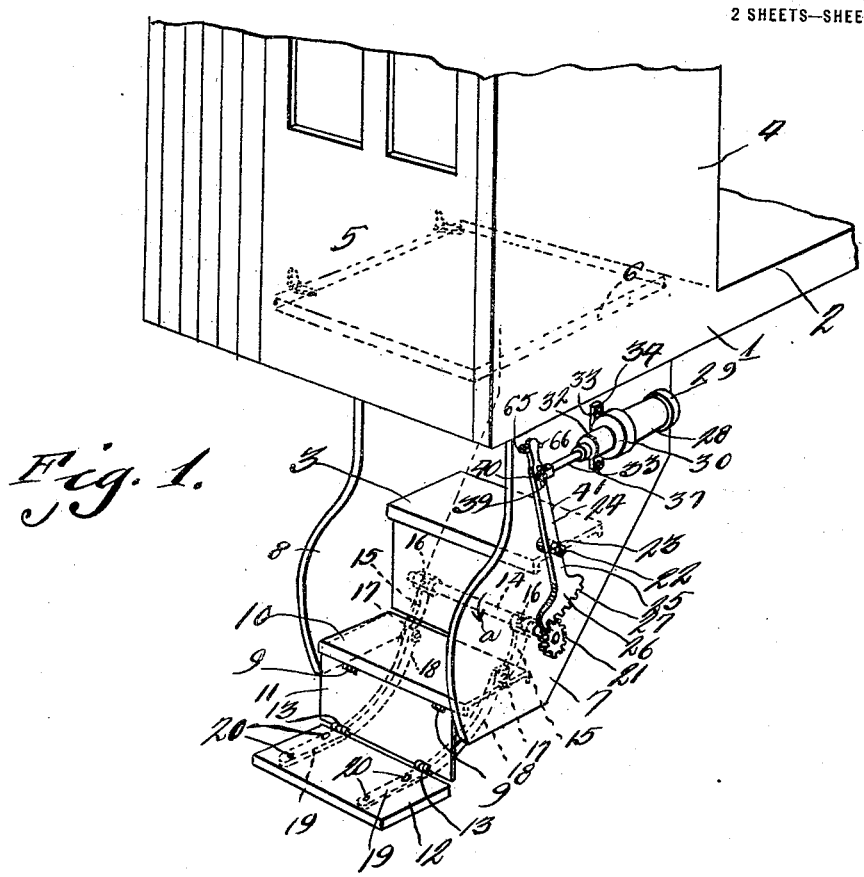

H. D. KIRKLEY.
MECHANISM FOR OPERATING AN EXTENSIBLE CAR STEP.
APPLICATION FILED JAN. 21, 1916.

1,198,357.

Patented Sept. 12, 1916.
2 SHEETS—SHEET 1.

Witnesses

Inventor
H. D. Kirkley
By D. Swift & Co.
Attorneys

H. D. KIRKLEY.
MECHANISM FOR OPERATING AN EXTENSIBLE CAR STEP.
APPLICATION FILED JAN. 21, 1916.
1,198,357.
Patented Sept. 12, 1916.
2 SHEETS—SHEET 2.
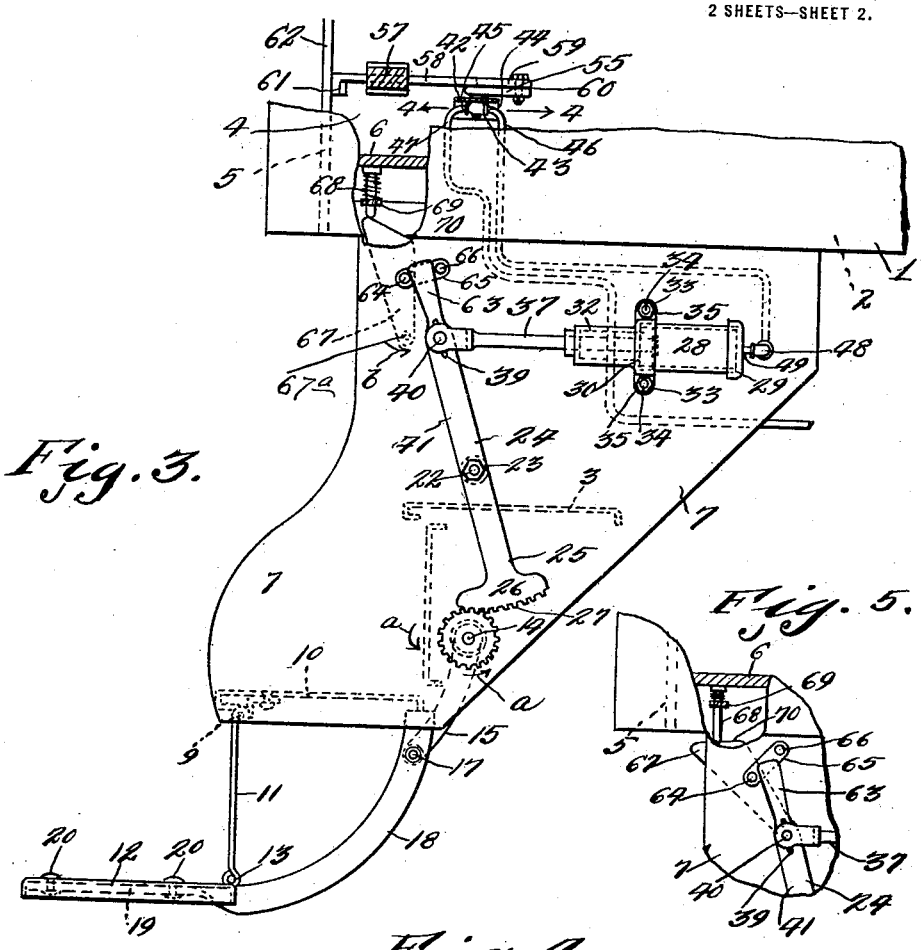
Fig. 3.
Fig. 5.
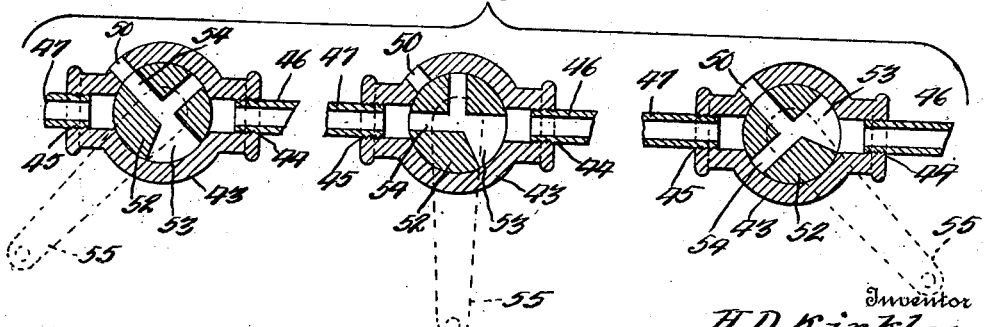
Fig. 4.
Witnesses
Philip Terrell
Frances H. Bowell
Inventor
H. D. Kirkley
By D. Swift & Co.
his Attorney.

UNITED STATES PATENT OFFICE.

HIRAM D. KIRKLEY, OF PARAGOULD, ARKANSAS.

MECHANISM FOR OPERATING AN EXTENSIBLE CAR-STEP.

1,198,357. Specification of Letters Patent. Patented Sept. 12, 1916.

Application filed January 21, 1916. Serial No. 73,438.

*To all whom it may concern:*

Be it known that I, HIRAM D. KIRKLEY, a citizen of the United States, residing at Paragould, in the county of Greene, State of Arkansas, have invented a new and useful Mechanism for Operating an Extensible Car-Step; and I do hereby declare the following to be a full, clear, and exact description of the invention, such as will enable others skilled in the art to which it appertains to make and use the same.

This invention relates to an improved mechanism for operating an extensible car step of a structure similar to that disclosed in the patent issued August 11, 1914, to H. D. Kirkley, Patent No. 1,107,170, and an object of this invention is to improve, simplify, and render more efficient and practical the operating means set forth, shown in the drawings and claimed in the application of H. D. Kirkley, filed Oct. 26, 1915, Serial No. 57,959, for a pneumatic mechanism for operating an extensible car step.

Another object of the invention is the provision of a spring tensioned piston or the like mounted in a pneumatic cylinder and having such connections with the train pipe, as to pneumatically actuate the piston against the tension of the spring tensioning means, to extend or throw the step downwardly, owing to the lever and rack and pinion connection between the piston and the extensible step.

Another object of the invention is to avoid the use of especially constructed valve for admitting air into the pneumatic cylinder, and instead provide a common standard three-way valve for accomplishing the same purpose.

Another object of the invention is to provide means for connecting the opposite sides of the three way valve to the air line of the train and the pneumatic cylinder, said means consisting of proper pipes, which may be bent as shown to provide the connections, instead of elbows and fittings.

Another object of the invention is to provide improved means connected to the operating lever of the valve, and being exposed in the path of the vestibule door, so that in case the trainman enters the car, and inadvertently leaves the extensible step lowered, the vestibule door will contact with and operate said means (which in trade is entitled "fool-proof" means), thereby receding or returning the step to its closed position.

Another object of the invention is the provision of a lever (which as before stated is operated by the piston of the pneumatic cylinder, that is, when air is in the air line of the train) adapted to be operated by hand from the exterior of the car steps, when the car is disconnected from the train, and there is no air in the air line of said car.

Another object of the invention is the provision of a device to engage said lever when operated by hand or manually, to hold the lever in its abnormal position against the tension of the spring means, to hold the step extended. Said device may be actuated manually to release the lever.

Another object of the invention is the provision of means or an element, adapted to be actuated by the trap door of the platform of the car, which element or means in turn actuates said device to release said lever, thereby permitting the spring means to return the step to its initial position.

In practical fields the details of construction may necessitate alterations, falling within the scope of what is claimed.

The invention comprises further features and combination of parts, as hereinafter set forth, shown in the drawings and claimed.

In the drawings: Figure 1 is a view in perspective of a railway car, showing the ordinary or conventional form of car step, provided with an extensible step, and illustrating the pneumatic means having a sector lever and teeth and pinion connections with the extensible step for extending the same. Fig. 2 is an enlarged detail sectional view through the pneumatic cylinder, showing the piston thereof under spring tension. Fig. 3 is a view in side elevation of the car steps and the means for extending the extensible step thereof, and illustrating the valve to be operated by its lever 55 for letting in and cutting off the air in said means, and the means for engaging said lever when actuated manually, to lock said lever, said means for engaging and locking the lever adapted to be actuated by a plunger, which in turn is depressed by the trap door of the platform of the car, to release the lever. Fig. 4 is a sectional view on line 4—4 of Fig. 3 of the three way valve and showing its connections adapted to be actuated by the vestibule door to return the valve to its initial position to permit the escape of air in the pneumatic cylinder, and to allow the spring means to recede or close the extensible step. Fig. 5 is a view showing the relative positions of the parts adapted to be actuated by the trap door of the platform of the car for releasing the lever when the trap door is lowered, to recede or close the extensible step.

Referring more especially to the drawings, 1 designates the car, the platform 2 of which is provided with the usual or conventional form of car steps 3, whereas 4 denotes the vestibule, 5 the vestibule door, and 6 the trap door. The usual or conventional steps 3 are provided with the side pieces 7 and 8. Hinged at 9 to the lower tread 10 of the steps 3 is the rise piece 11 of the extensible step, and to the lower edge of which rise 11 the extensible step 12 is hinged at 13. Mounted in bearings of the sides 7 and 8 of the ordinary or conventional steps is a rock shaft 14, to which the arms 15 are pinned as shown at 16 to rock with the shaft. The arms 15 are in turn pivoted at 17 to the upper inner ends of the arms 18, the lower laterally extending flat portions 19 of which are secured at 20 to the under face of the extensible step 12, so that when the shaft 14 is rocked in the direction of the arrow $a$, the arms 15 will pull upon the arms 18, thereby swinging the rise piece 11 upon its hinges, and throwing the extensible step 12 and the rise piece 11 upwardly underneath the lower tread step 10 of the ordinary or stationary step. Upon one end of the rock shaft 14 a pinion 21 is fixed. Pivoted upon a stub shaft or pin 22 of the outer face of the side 7 of the ordinary steps, by means of the nut 23 is a lever 24. The short arm 25 of the lever is formed with a sector 26 having teeth 27 meshing with the teeth of the pinion 21. A pneumatic cylinder 28 is provided having a cap head 29 threaded to one end. A cap head 30 is threaded at 31 to the opposite end of the cylinder 28, but this cap head 30 has a cylindrical extension box 32 formed integral therewith. The cap head 30 is formed with integral lateral ears 33, which receive bolts 34 which pass through the upper part of the side 7 of the conventional form of step, which bolts 34 are provided with nuts 35, by means of which and the bolts the cap head 30 (into which the cylinder 28 is threaded) is securely fastened to the side 7 of the steps. A conventional form of piston 36 is operable in the cylinder 28, and is provided with a piston rod 37, coiled about which is a spring 38, which is interposed between the end portion 39 of the extension boxing 32 and the piston 36, thereby holding the piston normally adjacent the cap head 29. The piston rod at its outer end is provided with a slot and pin connection 39 and 40 with the longer arm 41 of the lever 24. Secured by means of a bracket 42 upon the end of the car on the interior of the vestibule is a three way valve casing 43, into two directly opposite openings 44 and 45 of which copper tubes or pipes 46 and 47 are connected. The tube or pipe 46 passes down to the platform of the vestibule, then through the side 7 of the conventional form of car step, and is connected by an elbow 48 to a fitting 49, which in turn is threaded into the cap head 29. The other opening 50 of the valve casing 43 is at right angles to the openings 44 and 45, and open to the atmosphere, and mounted in the casing 43 is a valve 52 having passages 53 and 54, and which valve is so normally arranged when the piston 36 is adjacent the cap head 29, that the tube 46 is in communication with the outlet 50, through the medium of one of the passages 53 or 54 of the valve, and both passages 53 and 54 are out of communication with the tube or pipe 47. However, when the valve handle 55 is manipulated, the valve is so operated that the two tubes 46 and 47 are thrown into communication and the opening 50 out of communication, thereby permitting air under pressure to enter the cylinder 28, actuating the piston 36 against the tension or action of the spring 38, thereby moving the piston rod 37, and oscillating the lever 24, which, through the medium of the sector gear and pinion connection, the rock shaft 14, will throw the extensible step 12 downwardly. The valve is then turned, so as to cut off communication between the tubes 46 and 47, but still leave the opening 50 out of communication, thereby holding the air in the cylinder 28, which will hold the piston in the position shown in Fig. 2, and hold the extensible step down or extended. However, just so soon as the operating valve handle 55 is manipulated to throw the pipe or tube 46 in communication with the opening 50, the air passes out of the cylinder 28, then through the medium of the spring 38, the piston 36 will be returned toward and to a position adjacent the cap head 29, and in this case the extensible step 12 will be receded or returned to its normal closed position.

Mounted in a guide 57 is a slide 58, one end 59 of which has the slot and pin connection 60 with the free end of the valve lever or arm 55, while the other end of the slide 58 has an abutment 61 disposed in the path of the door 62 of the vestibule. In case the trainman enters the car and inadvertently leaves the extensible step down, the door 62 of the vestibule when nearing a closed position will strike the abutment 61, operate the slide 58 and move the arm 55, so as to throw the opening 50 in communication with the tube or pipe 46, thereby permitting the air in the cylinder to escape, allowing the spring 38 to act and return the piston 36 back adjacent to the cap head 29, thereby receding the extensible step. The upper part of the lever 24 terminates in a handle 63 adapted to be grasped by a trainman, for operating the lever manually from the exterior, that is, in case the air in the air line of the car is cut off. A pivot pin 64 is mounted in a bearing of the upper part of the side 7 of the steps, and movable with the outer end of this pin is a plate or link 65, the free end portion of which is provided with a lateral pin 66, which is designed to engage in the rear of the handle 63 of the lever 24, in the manner shown in Fig. 3, when the lever 24 is operated manually. This plate 65 is upon the outer face of the side of the steps. Movable with the inner end of the pivot pin 64 and operable adjacent the inner face of the side 7 of the steps is a plate 67, which is substantially triangular in shape. When it is desired to disengage the pin 66 from the rear edge of a handle 63, the lower end of the plate 67 is moved in the direction of the arrow $b$, thereby rocking the pin 64 and lifting the pin 66 from the path of the handle 63 of the lever 24, thereby allowing the lever to return to its initial position under the action of the spring 38, the return of said lever to its initial position recedes the extensible step. A plunger 68 is mounted in a guide 69, and when the pin 66 is engaging the rear edge of the handle 63 of said lever 24, the lower end (which is rounded) of the plunger 68 engages the cam edge 70 of the plate 67. When the lever 24 is operated manually to extend the step, it is unnecessary for the trainman to remove the pin 66 from engagement with the rear edge of the handle 62 by moving the plate 67 in the direction of the arrow $b$, that is, after having reached the stationary steps upon entering the vestibule, for the lever 24 may be released by the closing of the trap door of a platform. For instance, the trap door when gravitating to its closed position, will contact with the plunger 68 to cause its lower rounded end to cam against the edge 70 of the plate 67, thereby rocking the pin 64 and the plate 65, lifting the pin 66 from the path of the handle 63 of the lever, and allow the lever to return to its initial position and recede the extensible step. Even though the lever 24, at times is actuated by the pneumatic means to extend the extensible step, the lever may be locked or latched by the trainman grasping the pin $67^a$ for operating the plate 67 manually to throw the pin 66 in the path of the lever. In this case the trainman after reaching the vestibule and closing the vestibule door, may recede the extensible step by closing the trap door, as before stated.

Should a trainman or other person approach the steps of the car and find the extensible step closed or receded, the extensible step may be lowered, by grasping the handle end of the lever 24, operating the same manually, then by grasping the pin $67^a$ (which extends laterally) with the other hand, the plate 67 may be actuated manually, to throw the pin 66 in the path of the handle end of the lever, thereby holding the extensible step lowered against the action of the spring in the pneumatic cylinder.

The invention having been set forth, what is claimed as new and useful is:

1. In combination with the vestibule car step having an extensible and collapsible step, an operating lever therefor, a reciprocating member to actuate the lever in one direction, pneumatic means to operate said member, and spring means against which the member is actuated, for returning the member, to return the lever to its initial position for collapsing the step, said pneumatic means including a device adapted to be actuated to relieve the pressure in the pneumatic means to permit the spring means to expand to reverse the movement of said member, said device having an actuating arm, and an element connected to the arm and disposed in the path of the vestibule door, whereby said device may be actuated automatically to relieve the pressure in the pneumatic means to permit the spring means to reverse the movement of the member.

2. In combination with the vestibule car steps having an extensible and collapsible step, an operating lever therefor, a member, spring means therefor against which the member is actuated, pneumatic means to actuate said member against the spring means to move the lever in one direction to an abnormal position extending said step, and a latch to lock the lever in said abnormal position, a device in said pneumatic means, connections between said device and the vestibule door for actuating the device when the door approaches a closed position to relieve the pressure of said pneumatic means.

3. In combination with the vestibule car steps having an extensible and collapsible step, an operating lever therefor, a member, spring means therefor against which the member is actuated, pneumatic means to actuate said member against the spring means to move the lever in one direction to an abnormal position extending said step, and a latch to lock the lever in said abnormal position, a device in said pneumatic means, connections between said device and the vestibule door for actuating the device when the door approaches a closed position to relieve the pressure of said pneumatic means, and an element adapted to be actuated by the trap door of the vestibule to actuate the latch to release the lever, permitting the spring means to return the lever to its normal position and receding the step.

4. In combination with the vestibule car step having an extensible and collapsible step, an operating lever therefor, a mechanism to move the lever in one direction to an abnormal position extending the extensible step, a latch for holding said lever in said abnormal position, and means actuated by the trap door of the vestibule to actuate the latch to release the lever.

5. In combination with the vestibule car step having an extensible and collapsible step, an operating lever therefor, a mechanism to move the lever in one direction to an abnormal position extending the extensible step, a latch for holding said lever in said abnormal position, and means actuated by the trap door of the vestibule to actuate the latch to release the lever, and means for returning the lever to its normal position.

6. In combination with the vestibule car step having an extensible and collapsible step, an operating lever therefor, a mechanism to move the lever in one direction to an abnormal position extending the extensible step, a latch for holding said lever in said abnormal position, and means actuated by the trap door of the vestibule to actuate the latch to release the lever, spring means for returning the lever to its normal position, and means for holding said mechanism actuated to hold the lever in its abnormal position even while the latch engages the lever, and means for releasing said holding means prior or subsequently to releasing the latch, permitting the returning means to operate the lever to its normal position.

7. In combination with the vestibule car steps having an extensible and collapsible step, an operating lever therefor adapted to be actuated manually to an abnormal position to extend the step, a latch to hold the lever in such position, and means adapted to be actuated by the trap door of the vestibule to actuate the latch to release the lever.

8. In combination with the vestibule car steps having an extensible and collapsible step, an operating lever therefor adapted to be actuated manually to an abnormal position to extend the step, a latch to hold the lever in such position, and means adapted to be actuated by the trap door of the vestibule to actuate the latch to release the lever, and spring means for automatically returning the lever to its normal position.

9. In combination with vestibule car steps having an extensible and collapsible step, an operating lever therefor, a member, spring means therefor against which the member is actuated, pneumatic means to actuate said member against the spring means to move the lever in one direction to an abnormal position extending said step, a device in said pneumatic means, connections between said device and the vestibule door for actuating the device when the door approaches a closed position to relieve the pressure of said pneumatic means.

10. In combination with the vestibule car steps having an extensible and collapsible step, an operating lever therefor to extend the step, pneumatic means to actuate the lever, a plate having a cam edge and being pivoted to the inner face of one side of the vestibule car step and provided with a pin to engage in the path of the lever to hold the step extended, and means to engage and coöperate with the cam edge and designed to be actuated by the trap door of the vestibule to actuate the latch to release the lever.

11. In combination with the vestibule car steps having an extensible and collapsible step, an operating lever therefor to extend the step, pneumatic means to actuate the lever, a plate having a cam edge and being pivoted to the inner face of one side of the vestibule car step and provided with a pin to engage in the path of the lever to hold the step extended, and means to engage and coöperate with the cam edge and designed to be actuated by the trap door of the vestibule to actuate the latch to release the lever, said means comprising a guide upon one of the inner faces of the vestibule, a headed pin in said guide and including spring means between the head and the guide to raise the pin after elevating the trap door to allow the plate to gravitate to its normal position.

12. In combination with the vestibule car steps having an extensible and collapsible step, an operating lever therefor, a pneumatic mechanism to move the lever in one direction to an abnormal position extending the extensible step, a latch for holding said lever in said abnormal position and having a cam edge, and a spring tensioned plunger to be actuated by the trap door of the vestibule to ride against the cam edge to tilt the latch and release the lever.

In testimony whereof I have signed my name to this specification in the presence of two subscribing witnesses.

HIRAM D. KIRKLEY.

Witnesses:
B. A. BROWN,
J. W. GRIFFIN.

Copies of this patent may be obtained for five cents each, by addressing the "Commissioner of Patents, Washington, D. C."